United States Patent [19]

Auracher

[11] Patent Number: 4,709,977

[45] Date of Patent: Dec. 1, 1987

[54] CONTROLLABLE DIRECTIONAL COUPLER

[75] Inventor: Franz Auracher, Baierbrunn, Fed. Rep. of Germany

[73] Assignee: Siemens Aktiengesellschaft, Berlin and Munich, Fed. Rep. of Germany

[21] Appl. No.: 723,874

[22] Filed: Apr. 16, 1985

[30] Foreign Application Priority Data

Jun. 1, 1984 [DE] Fed. Rep. of Germany ....... 3420580

[51] Int. Cl.⁴ ............................................. G03B 6/10
[52] U.S. Cl. ................................ 350/96.14; 350/96.13
[58] Field of Search ............... 350/96.11, 96.12, 96.13, 350/96.14, 96.15; 331/113

[56] References Cited

U.S. PATENT DOCUMENTS 3,936,144 2/1976 Caton ........................... 350/96.12 X
4,583,817 4/1986 Papuchon ..................... 350/96.12 X

OTHER PUBLICATIONS

Appl. Phys. Lett. 35(1), Jul. 1, 1979, Minakata "Efficient LiHbO₃ Balanced Bridge Modulator/Switch with an Ion-Etched Slot", pp. 40-42.
Alferness et al. "Low Loss Fibre-Coupled Waveguide Directional Coupler Modulator", Electronics Letters, Jun. 10, 1982, vol. 18, No. 12, pp. 490-491.

*Primary Examiner*—Eugene R. Laroche
*Assistant Examiner*—James C. Lee
*Attorney, Agent, or Firm*—Hill, Van Santen, Steadman & Simpson

[57] ABSTRACT

A controllable directional coupler comprises two optical waveguides on the surface of a substrate of electro-optical material, the waveguides extending parallel for a predetermined distance. The coupler also comprises a control electrode structure including a pair of control electrodes formed on the surface of the substrate and covering the two parallel waveguides along their lengths. In order to achieve low control voltage and a low coupling loss, in the case of butt coupling to a monomode fiber, in the interstice between the two optical waveguides, the refractive index of the substrate is reduced to a specific depth of the substrate at which the coupling intensity becomes largely independent of the near-field expansion in the waveguides.

13 Claims, 1 Drawing Figure

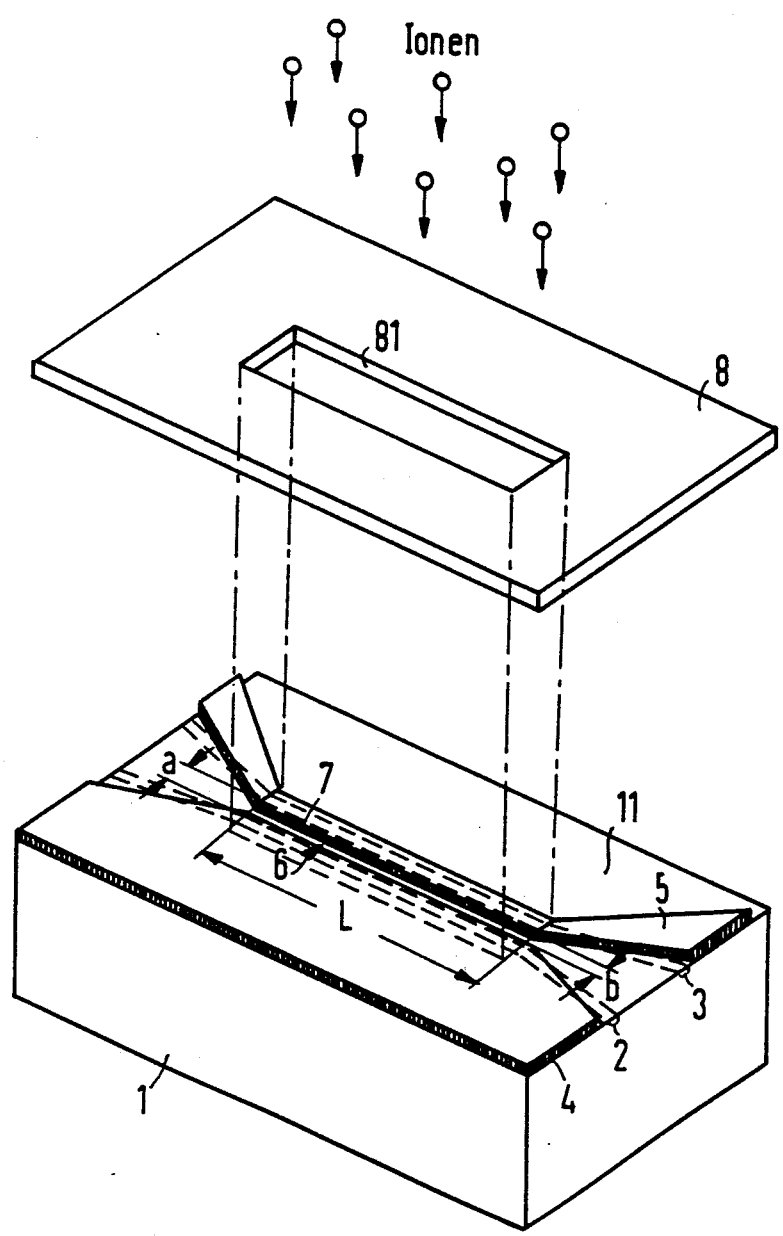

CONTROLLABLE DIRECTIONAL COUPLER

BACKGROUND OF THE INVENTION

1. Field of the Invention

The present invention relates to a controllable directional coupler having two optical waveguides formed in a substrate of electro-optical material on a surface of the substrate and extending parallel for a distance, and a control electrode structure formed on the surface and comprising a pair of control electrodes, the control electrode structure covering the two parallel waveguides.

2. Description of the Prior Art

Controllable directional couplers of the type generally set forth above, for example, in a substrate of $LiNbO_3$, $LiTaO_3$, InGaAsP or GaAlAs, can be employed as rapid modulators and switches as disclosed, for example, by R. C. Alferness, L. L. Buhl and M. D. Divino in the article entitled "Low-Loss Fibre-Coupled Waveguide Directional Coupler Modulator", published in Electronics Letters 18 (1982), pp. 490–491.

SUMMARY OF THE INVENTION

It is the object of the present invention to provide a rapid electro-optical modulator or transfer switch in a waveguide embodiment according to the principle of the controllable directional coupler which is simultaneously optimized with respect to control voltage and coupling loss in the case of butt coupling to a monomode fiber.

The above object is achieved, according to the present invention, in a controllable directional coupler of the type set forth above which is particularly characterized in that the refractive index of the substrate is lowered to a specific depth of the substrate in the interstice between the two parallel optical waveguides.

The following considerations play a decisive role in the origin of the invention. In order to obtain a low control voltage with a given cutoff frequency, the maximum length L of the directional coupler i.e. of the parallel optical waveguides, should be selected, which is possible due to the transit time effect. Moreover, the coupling intensity between the parallel waveguides is to be selected such that precisely a complete transfer coupling is achieved over the length L of the directional coupler.

In order to achieve low coupling losses in the case of butt coupling of a waveguide of the directional coupler to a monomode glass fiber, the near-field extension of the light guided in the optical waveguide of the directional coupler must correspond well to that in the glass fiber. For this near-field extension there then results a specific optimum distance between the parallel waveguides of the directional coupler and also the control voltages, which has the smallest control voltage as a consequence. The distance between the waveguides of the directional coupler and the near-field extension, however, also establish the coupling intensity between the parallel waveguides, and therefore also establish the coupling length $L_0$ for complete crossover coupling from one waveguide to the other, so that, in general, it is not possible to observe the optimum parameters for the operating voltage and insertion losses giving a specified cutoff frequency. If, by contrast, one reduces the refractive index between the parallel waveguides of the directional coupler between which the transfer or crossover coupling takes place, then the optimum coupling length $L_0 = L$ can be observed, which results from the transit time limitation, and simultaneously the optimum distance between the parallel waveguides and also the control electrodes of the directional coupler for minimum control voltage can be selected while the near-field parameters for minimum coupling loss, in the case of butt coupling to glass fibers, can be adjusted. According to preferred and advantageous embodiments of the directional coupler of the present invention, the reduction of the refractive index can take place, for example, through etching of a channel by ion or plasma etching, through a suitable ion exchange process, or through ion implantation. Generally, for the individual, for example, for the above-captioned substrate materials, the wet or dry chemical etching processes conventional for this purpose can be employed. In the case of $LiNbO_3$ components, for example, an ion implantation with He ions, or an ion etching in a fluorous molecular gas, for example, in a $CHF_3$ gas, can be carried out. Advantageously, for the reduction of the refractive index, the electrode structure itself can serve as a mask, in particular, as an etching mask, so that a self-aligning process is provided. Only the regions outside of the electrode structure need then be covered by an additional auxiliary mask, the adjustment of which, however, is not critical.

The directional coupler constructed in accordance with the present invention is suitable as a changeover switch for glass fiber systems.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE showing, in an exploded perspective view, a controllable directional coupler constructed in accordance with the present invention.

DESCRIPTION OF THE PREFERRED EMBODIMENTS

Referring to the drawing, a controllable directional coupler is illustrated having optical waveguides and an electrode structure on the upper surface 11 of a substrate 1, above which an auxiliary mask is arranged which, together with the electrodes, is employed as a mask in the production of the refractive index reduction between the waveguides and the control electrodes by way of ion implantation or ion etching.

The controllable directional coupler, as seen on the drawing, is designed on the upper surface 11 of the substrate 1 in the form of a $LiNbO_3$ crystal and comprises two optical waveguides 2 and 3 designed in the substrate 1 on the upper surface 11. The waveguides 2 and 3 can have been produced, for example, through indiffusion of titanium or ion exchange or ion implantation in the substrate 1. They extend parallel for a distance of a length L and at a distance a from one another.

On the upper surface 11 of the substrate 1, above the parallel waveguides 2 and 3, a control electrode structure is provided which consist of a pair of control electrodes 4 and 5, arranged at a distance from one another, which cover the parallel waveguides 2 and 3. The two control electrodes 4 and 5 are separated from one another above the interstices 6 between the parallel waveguides by a continuous gap 7 having a width b, extending in the longitudinal direction of the parallel waveguides 2 and 3, which gap 7 corresponds approximately to the distance n between the parallel waveguides 2 and 3.

The refractive index of the substrate 1 is reduced in the interstices 6 between the parallel waveguides 2 and 3 beneath the gap 7 of the control electrodes 4 and 5, which can be employed as a mask, so that a self-adjusting method is provided. In order that the regions of the upper surface 11 of the substrates 1 outside of the gap 7, which are not covered by the control electrodes 4 and 5, are not exposed to any action reducing the refractive index, an auxiliary mask 8 having a window 81 is additionally arranged above the control electrodes 4 and 5, the window 81 being so dimensioned that the auxiliary mask 8 leaves the gap 7 between the control electrodes 4 and 5 exposed, but the remainder of the mask provides a covering for the remaining regions of the upper surface 11 of the substrate 1. The action lowering the refractive index, for example, an ion beam directed at the window 81 of the auxiliary mask 8, which ion beam effects an etching or implantation of the surface 1, can act in this manner only on the portion of the substrate exposed in the gap 7. A refractive index reduction thereby results in the interstice 6 between the parallel optical waveguides 2 and 3, which reduction is to be carried out up to a specific depth of the substrate.

The following is provided for an improved understanding of the meaning and purpose of the refractive index reduction in the interstice 6 between the parallel optical waveguides 2 and 3. In order to reach very high bandwidths of 5 GHz and more with low control voltages, the directional coupler must be so dimensioned that the length L of the coupler is equal to the coupling length $L_O$, which corresponds to the length of the distance over which complete crossover coupling takes place. If typical monomode glass fibers, for example, for the wavelength $\lambda = 1.3 - 1.5$ $\mu$m are to be butt coupled to the optical waveguides 2 and 3 of the directional coupler with low coupling loss, then the near field of the waveguide 2 or 3 in the substrate 1 of the electro-optical material must be well matched to that of the glass fiber. Typical spot radii of the intensity profile of the light guided in such glass fibers are approximately 4-5 $\mu$m.

In the case of large near-field extensions or expansions of this type in the waveguides 2 and 3 of the directional coupler, the coupling between the parallel waveguides 2 and 3 in the case of distances a in the micrometer range is relatively strong. This has as a consequence the fact that the distance a of the parallel waveguides 2 and 3 must likewise be selected to be relatively great in order that the coupling intensity becomes sufficiently small and, hence, the coupling length $L_O$ becomes sufficiently great. A great length L of the directional coupler and, because of the condition $L = L_O$, a great coupling length $L_O$, is also desired because the necessary control voltage is inversely proportional to the length L of the directional coupler. In the case of rapid directional couplers, the maximum length L is limited by the required 3 dB cutoff frequency fg due to the transit time effect; in the case of LiNbO$_3$ modulators it amounts to $L^{mm} \approx 100 - 150$ GHz mm/fg$^{GHz}$.

The great distance a between the parallel waveguides 2 and 3, however, also requires a great width b of the gap 7 between the control electrodes 4 and 5, whereby the required control voltage increases in relation to the value for optimum width b of the gap 7.

However, if it is possible to adjust the coupling intensity largely independently of the near field expansion in the optical waveguides 2 and 3, it is then possible to observe the optimum distance a between the parallel waveguides 2 and 3, which optimum distance a is necessary for the lowest operating voltage, and therefore simultaneously obtain low insertion or coupling loss and the lowest control voltage for the given cutoff frequency. This can be achieved in that, in the interstice 6 between the two parallel optical waveguides 2 and 3, the refractive index of the substrate 1 is lowered to a specific depth at which the coupling intensity becomes largely independent of the near-field expansion in the waveguides 2 and 3.

As already mentioned, the reduction of the refractive index can be achieved, for example, through etching of a channel by way of ion or plasma etching, through a suitable ion exchange process, or through an ion implantation. In the case of LiNbO$_3$ components, for example, an ion implantation of He-ions or an ion etching in a CHF$_3$ gas can be carried out. In the case of GaAlAs or InGaAsP components, the wet or dry chemical etching processes conventional for these materials can likewise be employed.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a controllable directional coupler of the type in which a pair of light waveguides extend parallel to one another for a length L at a surface of a substrate of electro-optical material defining an interstice therebetween, and in which a control electrode structure is carried on the surface of the substrate and comprises a pair of spaced control electrodes respectively positioned over respective ones of said waveguides, the improvement therein comprising:

a zone in the interstice having a lower refractive index down to a predetermined depth with respect to the remainder of the substrate, whereby the lower refractive index and the predetermined depth are selected such that a cross over between the two wave guides still occurs.

2. The improved directional coupler of claim 1, wherein:

said zone comprises a channel in the substrate.

3. The improved directional coupler of claim 1, wherein:

said zone comprises doped substrate material.

4. In a method of making a directional coupler which comprises a pair of light waveguides extending parallel to one another at a surface of a substrate of electro-optical material and defining an interstice therebetween, and a control electrode structure carried on the surface and including a pair of spaced electrodes respectively located over respective ones of the waveguides, the improvement comprising the step of:

lowering the refractive index of the substrate material in the interstice to a predetermined depth with respect to the refractive index of the remainder of the substrate, including selecting the refractive index in the interstice and the predetermined depth such that a crossover between the two waveguides still occurs.

5. The improved method of claim 4, wherein:
the step of lowering the refractive index is further defined as:
wet-chemical etching a channel in the substrate.

6. The improved method of claim 4, wherein:
the step of lowering the refractive index is further defined as:
dry-chemical etching a channel in the substrate.

7. The improved method of claim 4, wherein:
the step of lowering the refractive index is further defined as:
ion etching a channel in the substrate.

8. The improved method of claim 4, wherein:
the step of lowering the refractive index is further defined as:
plasma etching a channel in the substrate.

9. The improved method of claim 4, wherein:
the step of lowering the refractive index is further defined as:
ion implanting a channel in the substrate.

10. The improved method of claim 4, wherein:
the step of lowering the refractive index is further defined as:
ion exchanging a channel in the substrate.

11. The improved method of claim 4, wherein the substrate is $LiNbO_3$ and wherein:
the step of lowering the refractive index is further defined as:
placing the substrate in a fluorous molecular gas environment, and
ion etching a channel in the substrate in the gas.

12. The improved method of claim 4, wherein the substrate is $LiNbO_3$ and wherein:
the step of lowering the refractive index is further defined as:
placing the substrate in a $CHF_3$ gas environment, and
ion etching a channel in the substrate in the gas.

13. The improved method of claim 4, wherein:
the step of lowering the refractive index is further defined as:
doping the substrate at the interstice.

* * * * *